US009768630B2

(12) United States Patent
Yan

(10) Patent No.: US 9,768,630 B2
(45) Date of Patent: Sep. 19, 2017

(54) REAL TIME COMPENSATING POWER OUTPUT CHARGING CIRCUIT

(71) Applicant: HON HAI PRECISION INDUSTRY CO., LTD., New Taipei (TW)

(72) Inventor: Yu-Hu Yan, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 94 days.

(21) Appl. No.: 14/717,077

(22) Filed: May 20, 2015

(65) Prior Publication Data

US 2016/0064982 A1    Mar. 3, 2016

(30) Foreign Application Priority Data

Aug. 28, 2014  (TW) .............................. 103129643 A

(51) Int. Cl.
*H01J 7/00* (2006.01)
*H02J 7/00* (2006.01)

(52) U.S. Cl.
CPC ............ *H02J 7/0052* (2013.01); *H02J 7/008* (2013.01)

(58) Field of Classification Search
CPC ........ G06F 1/26; G06F 1/3212; H02J 7/0052; H02J 7/007; H02J 2007/0037; H02J 50/12; H02J 7/0021; H02J 7/042
USPC ........ 320/107, 121, 128, 156–157, 159, 164
See application file for complete search history.

(56) References Cited

U.S. PATENT DOCUMENTS

| 2007/0188139 A1* | 8/2007 | Hussain | ................ H02J 7/0073 320/128 |
| 2013/0002199 A1* | 1/2013 | Hu | ........................ H02J 7/0004 320/112 |
| 2013/0221905 A1* | 8/2013 | Holloway | ............. H02J 7/0054 320/107 |

FOREIGN PATENT DOCUMENTS

| CN | 1790885 A | 6/2006 |
| CN | 202260542 U | 5/2012 |
| CN | 202872406 U | 4/2013 |
| TW | 200532416 | 10/2005 |
| TW | 200620778 | 6/2006 |
| TW | M424627 | 3/2012 |
| TW | 201431244 | 8/2014 |
| TW | 201432407 | 8/2014 |

OTHER PUBLICATIONS

Chun-Yao Huang, Design and Application of Intelligent Charge Controller Based on Single-chip Computer, Dec. 25, 2006, China Academic Journal Electronic Publishing House.

(Continued)

*Primary Examiner* — Nghia Doan
(74) *Attorney, Agent, or Firm* — Steven Reiss

(57) ABSTRACT

A battery charging circuit includes a power management IC, a controller, and a feedback circuit. The power management IC is configured to manage the power charging to a battery. The controller is configured to provide a preset value of current and a preset value of voltage. The feedback circuit is coupled to the power management IC and the controller and the battery. The feedback circuit compares the preset value of current with a charging current to the battery, and compares the preset value of voltage with a charging voltage to the battery to obtain results of comparison, and provides a feedback signal to the power management IC according to the comparisons. The power management IC decreases or increases power output upon the comparisons.

9 Claims, 1 Drawing Sheet

(56) References Cited

OTHER PUBLICATIONS

NB638: High Efficiency, Fast Transient, 7A, 28V Synchronous Step-down Converter in a Tiny 3×4mm QFN Package, MPS The Future of Analog IC Technology, Jun. 14, 2011.

* cited by examiner

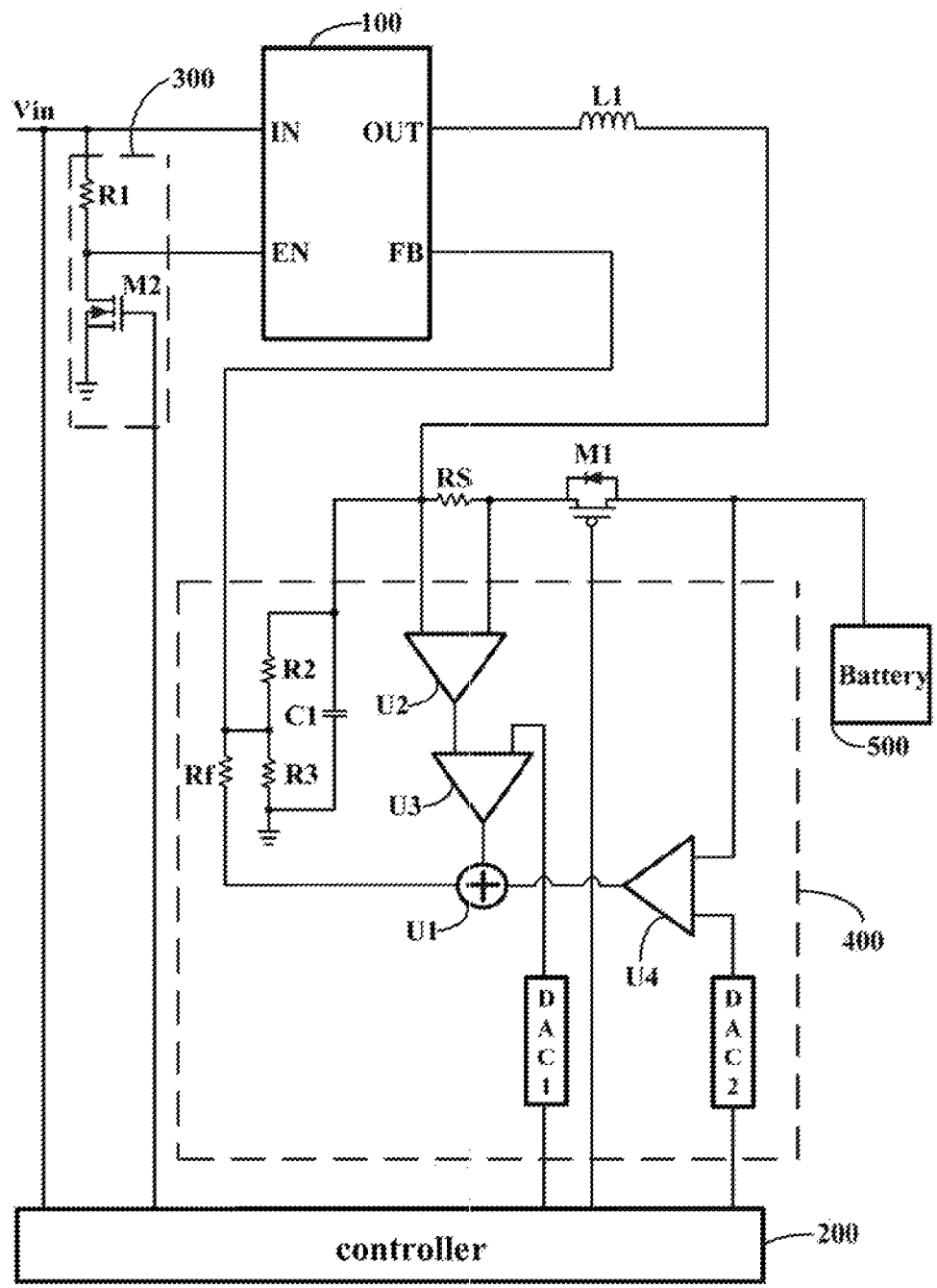

REAL TIME COMPENSATING POWER OUTPUT CHARGING CIRCUIT

FIELD

The subject matter herein generally relates to charging circuits.

BACKGROUND

Linear charging circuits are applied in electronic devices to provide energy. In general, there is variable potential difference between input voltages and output voltages of linear charging circuits and this variable potential difference wastes a lot of energy.

BRIEF DESCRIPTION OF THE DRAWING

Implementations of the present technology will now be described, by way of example only, with reference to the attached FIGURE.

The FIGURE is a diagrammatic view of one embodiment of a charging circuit.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a charging circuit.

The FIGURE is a diagrammatic view of one embodiment of a charging circuit. In at least one embodiment, the charging circuit is configured to charge a battery 500. The charging circuit includes a power management integrated circuit (IC) 100, a controller 200, a switching circuit 300, a feedback circuit 400 and the battery 500. The power management IC 100 is configured to manage the power charging to the battery 500 according to a feedback signal. The controller 200 is configured to output command signals to the power management IC 100. The controller 200 and an input terminal of the power management IC 100 are coupled to power source Vin to receive electrical power. The switching circuit 300 is coupled between an enable terminal EN of the power management IC 100 and the controller 200. When the controller 200 sends a controlling signal to the switching circuit 300, the switching circuit 300 sends an enable signal to enable terminal EN to work the power management IC 100. The feedback circuit 400 couples the power management IC 100, the controller 200, and the battery 500 to provide the feedback signal to the power management IC 100. According to the feedback signal, the power management IC 100 adjusts the output power of the output terminal OUT. In at least one embodiment, when a voltage of the enable signal is low level, the power management IC 100 shuts off the output power of the output terminal OUT. When the voltage of the enable signal is high level, the power management IC 100 outputs the output power via the output terminal OUT.

A first conducting end of a first metal oxide semiconductor (MOS) M1 is coupled to the output terminal OUT of the power management IC 100 via a sampling resistor Rs and an inductor L1. A second conducting end of the first MOS M1 is coupled to the battery 500. The controlling end of the first MOS M1 is coupled to the controller 200. The inductor L1 is configured to store energy. When the controller 200 sends a signal to the first MOS M1, the first MOS M1 adjusts charging current to the battery 500. In at least one embodiment, the first MOS M1 is a high power MOS. The first conducting end of the first MOS M1 is a MOS drain electrode, the second conducting end of the first MOS M1 is a MOS source electrode, and the controlling end of the first MOS M1 is a MOS gate electrode.

The switching circuit 300 further includes a first resistor R1 and a switch M2. The first conducting end of the switch M2 is coupled to the power source Vin and the enable terminal EN of the power management IC 100. The second conducting end of the switch M2 is grounded. The controlling end of the switch M2 is coupled to the controller 200 and receives the control signal of the controller 200. In at least one embodiment, the switch M2 is a MOS. The first conducting end of the switch M2 is a MOS drain electrode, the second conducting end of the switch M2 is a MOS source electrode, and the controlling end of the switch M2 is a MOS gate electrode. The first conducting end of the switch M2 is grounded, and the enable terminal EN of the power management IC 100 receives a control signal of low level voltage. Thus, the power management IC 100 shuts off the power being output to the battery. In other embodiments, the switching circuit 300 may be other controllable switches or transistor circuits.

The feedback circuit 400 further includes a mixer U1, a first error amplifier U2, a second error amplifier U3, a third error amplifier U4, a first digital to analog converter (DAC) DAC1, a second DAC DAC2, a capacitor C1, a second resistor R2, a third resistor R3, and a feedback resistor Rf.

In order to compare the preset value of current with a charging current to the battery, two input terminals of the first error amplifier U2 are respectively coupled to two terminals of the sampling resistor Rs to acquire and amplify the charging current to the battery 500. An output terminal of the first error amplifier U2 is coupled to an input terminal of the second error amplifier U3. An input terminal of the first DAC DAC1 is coupled to the controller 200. On receiving a preset value of current sent by the controller 200, the first DAC DAC1 converts the preset value of current into an analog current signal. An input terminal of the second error amplifier U3 is coupled to an output terminal of the first error amplifier U2 and another input terminal of the second error amplifier U3 is coupled to an output terminal of the first DAC DAC1. The second error amplifier U3 compares the analog current signal with an amount of current output by the first error amplifier U2. Then the second error amplifier U3 outputs a result of comparing between the preset value of current and the charging current to the battery 500. An input terminal of the mixer U1 is coupled to an output terminal of the second error amplifier U3 to receive the result of comparing currents.

An output terminal of the mixer U1 is coupled to a feedback terminal of the power management IC 100 via the feedback resistor Rf. The mixer U1 outputs a feedback signal to the power management IC 100. The capacitor C1 and the third resistor R3 are coupled in series and are coupled to the second resistor R2 in parallel. A conducting end of the feedback resistor Rf is coupled between the second resistor R2 and the third resistor R3 so that a voltage of the feedback signal to the power management IC can be adjusted.

For example, the first error amplifier U2 acquires the charging current to the battery 500 from the sampling resistor Rs and outputs an amplified charging current to the second error amplifier U3. The second error amplifier U3 compares the amplified charging current with the analog signal representing the preset value of current. The second error amplifier U3 then outputs the result of comparing the levels of current to the mixer U1. As the result of comparing amounts of current, if the charging current to the battery 500 is higher than the preset value of current, the second error amplifier U3 outputs a higher voltage to the power management IC 100 and the power management IC 100 decreases the output power. If the charging current to the battery 500 is lower than the preset value of current, the second error amplifier U3 outputs a lower voltage to the power management IC 100 and the power management IC 100 increases the output power.

An input terminal of the third error amplifier U4 is coupled to an input terminal to the battery 500 to acquire the charging voltage to the battery 500. Another input terminal of the third error amplifier U4 is coupled to an output terminal of the second DAC DAC2. An output terminal of the third error amplifier U4 is coupled to an input terminal of the mixer U1. An input terminal of the second DAC DAC2 is coupled to the controller 20 to acquire a preset value of voltage from the controller 200. Then the second DAC DAC2 converts the preset value of voltage into an analog voltage signal. The third error amplifier U4 compares the analog voltage signal with the charging voltage to the battery 500. Then the third error amplifier U4 outputs a result of comparing the preset value of voltage and the charging voltage to the battery 500. Another input terminal of the mixer U1 is coupled to an output terminal of the third error amplifier U4 to receive the result of comparing voltages.

For example, the third error amplifier U4 acquires the charging voltage from the battery 500. The third error amplifier U4 compares the charging voltage with the analog voltage signal converted from the preset value of voltage. Then the third error amplifier U4 outputs the result of comparing voltages to the mixer U1. If the charging voltage to the battery 500 is higher than the preset value of voltage, the third error amplifier U4 outputs a higher voltage to the power management IC 100 and the power management IC 100 decreases the output power. If the charging voltage to the battery 500 is lower than the preset value of voltage the third error amplifier U4 outputs a lower voltage to the power management IC 100, and the power management IC 100 increases the output power.

In at least one embodiment, if a feedback terminal FB of the power management IC 100 receives a higher voltage, the output power will be lower. If the feedback terminal FB of the power management IC 100 receives a lower voltage, the output power will be higher.

Many details are often found in art including other features of the charging circuit. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A charging circuit comprising:
   a power management integrated circuit (IC), configured to manage power charging of a battery;
   a controller, configured to provide a preset value of current and a preset value of voltage; and
   a feedback circuit, coupled to the power management IC and the controller and the battery, the feedback circuit configured to compare the preset value of current with a charging current to the battery, compare the preset value of voltage with a charging voltage to the battery to obtain comparing results, and provide a feedback signal to the power management IC according to the results of the comparisons; wherein the feedback circuit comprises:
      a first error amplifier with two first error amplifier input terminals coupled to two sampling resistor terminals respectively;
      a first DAC with a first DAC input terminal coupled to the controller to convert the preset value of current into an analog current signal;
      a second error amplifier with a second error amplifier first input terminal coupled to a first error amplifier output terminal, and a second error amplifier second input terminal coupled to a first DAC output terminal, configured to output a current comparing result between the preset value of current and the charging current to the battery;
      a second DAC with a second DAC input terminal coupled to the controller to convert the preset value of voltage into an analog voltage signal;
      a third error amplifier with a third error amplifier first input terminal coupled to a battery input terminal, and a third error amplifier second input terminal coupled to a second DAC output terminal, configured to output a voltage comparing result; and
      a mixer, wherein mixer input terminals are respectively coupled to a second error amplifier output terminal and a third error amplifier output terminal to receive the current comparing result and the voltage comparing result, and a mixer output terminal is coupled to a power management IC feedback terminal to output the feedback signal to the power management IC;
   wherein the power management IC is configured to decrease power output in event that the charging current to the battery is higher than the preset value of current or in event the charging voltage to the battery is higher than the preset value of voltage, and the power management IC is further configured to increase power output in event the charging current to the battery is lower than the preset value of current or in event the charging voltage to the battery is lower than the preset value of voltage.

2. The charging circuit as claimed in claim 1 further comprising a switching circuit coupled to the power management IC and the controller to switch the power management IC according to an enable signal from the controller.

3. The charging circuit as claimed in claim 2, wherein the switching circuit comprises a switch with a first conducting end coupled to an enable terminal of the power management IC, and a second conducting end grounded, and a controlling end coupled to the controller to receive the enable signal from the controller.

4. The charging circuit as claimed in claim 3, wherein the switch is a MOS, the first conducting end of the switch is a MOS drain electrode, the second conducting end of the switch is a MOS source electrode, and the controlling end of the switch is a MOS grid electrode.

5. The charging circuit as claimed in claim 3, wherein the switching circuit further comprises a first resistor coupled between the first conducting end of the switch and an input terminal of the power management IC.

6. The charging circuit as claimed in claim 1, wherein the feedback circuit further comprises a feedback resistor with a third conducting end coupled to the mixer output terminal and a fourth conducting end coupled to the power management IC feedback terminal.

7. The charging circuit as claimed in claim 6, wherein the feedback circuit further comprises a second resistor and a third resistor and a capacitor, wherein the capacitor and the third resistor are coupled in series and are coupled to the second resistor in parallel to adjust a voltage of the feedback signal to the power management IC.

8. The charging circuit as claimed in claim 1 further comprising a MOS with a first conducting end coupled to the power management IC and a second conducting end coupled to the battery and a controlling end coupled to the controller, configured to adjust charging current to the battery.

9. The charging circuit as claimed in claim 8, wherein the first MOS is a high power MOS and the first conducting end of the first MOS is a MOS drain electrode and the second conducting end of the first MOS is a MOS source electrode and the controlling end of the first MOS is a MOS grid electrode.

* * * * *